US010484158B2

United States Patent
Ni et al.

(10) Patent No.: US 10,484,158 B2
(45) Date of Patent: Nov. 19, 2019

(54) METHOD AND APPARATUS FOR RESOURCE ALLOCATION SIGNALING IN A JOINT TRANSMISSION CELLULAR COMMUNICATION SYSTEM

(71) Applicant: Hong Kong Applied Science and Technology Research Institute Co., Ltd., Shatin, New Territories (HK)

(72) Inventors: Jia Ni, Shatin (HK); Yuxian Zhang, Fanling (HK); Man Wai Victor Kwan, Shatin (HK); Eric Kong Chau Tsang, Kowloon (HK)

(73) Assignee: HONG KONG APPLIED SCIENCE AND TECHNOLOGY RESEARCH INSTITUTE COMPANY LIMITED, Shatin N.T. (HK)

( * ) Notice: Subject to any disclaimer, the term of this patent is extended or adjusted under 35 U.S.C. 154(b) by 289 days.

(21) Appl. No.: 15/413,662

(22) Filed: Jan. 24, 2017

(65) Prior Publication Data

US 2018/0213515 A1  Jul. 26, 2018

(51) Int. Cl.
*H04L 5/00* (2006.01)
*H04W 72/04* (2009.01)

(52) U.S. Cl.
CPC .......... *H04L 5/0053* (2013.01); *H04L 5/003* (2013.01); *H04L 5/0035* (2013.01); *H04W 72/042* (2013.01); *H04L 5/005* (2013.01)

(58) Field of Classification Search
CPC ..... H04L 5/0007; H04L 5/0053; H04L 5/003; H04L 5/0035; H04L 5/005; H04W 72/042; H04W 88/02; H04W 88/08
See application file for complete search history.

(56) References Cited

U.S. PATENT DOCUMENTS

2010/0246498 A1* 9/2010 Lim .............. H04L 5/0007
                                                370/329
2013/0051356 A1* 2/2013 Hong ............ H04L 5/0053
                                                370/329

(Continued)

FOREIGN PATENT DOCUMENTS

JP   WO2012126577 A1   9/2012
KR   WO2013042970 A2   3/2013

OTHER PUBLICATIONS

ZTE et al., "Multi-TRP Transmission considering advanced receiver", 3GPP TSG RAN WG1 NR Ad-Hoc Meeting, R1-1700119, Jan. 16-20, 2017. (Year: 2017).*

(Continued)

*Primary Examiner* — Khoa Huynh

(57) ABSTRACT

Provided is a method and an apparatus for signaling allocation of resources in a joint transmission communication system. The method includes determining one of a plurality of resource allocation schemes to be implemented by two or more of a plurality of transmission points (TPs) comprising a set of coordinated TPs for enabling said two or more of said TPs to transmit data to a scheduled user equipment (UE). The method may comprise determining a bit length of a resource allocation field for a resource allocation signal message based on a number N of resource blocks groups (RBGs) related to a bandwidth of the joint transmission communication system and a number M of TPs comprising said set of coordinated TPs and further include formatting the resource allocation signal message to provide the resource allocation field based on said determined bit length. The resource allocation signal message is transmitted from only one of said set of coordinated TPs to said scheduled UE.

19 Claims, 8 Drawing Sheets

(56) References Cited

U.S. PATENT DOCUMENTS

| | | |
|---|---|---|
| 2015/0098421 A1 | 4/2015 | Barbieri et al. |
| 2015/0189636 A1 | 7/2015 | Liu |
| 2016/0037511 A1 | 2/2016 | Vincze et al. |
| 2016/0100382 A1 | 4/2016 | He et al. |

OTHER PUBLICATIONS

PCT ISR dated Sep. 27, 2017 for PCT/CN2017/073536.
ZTE et al. Multi-TRP Transmission considering advance receiver 3 GPP TSG RAN WG1 NR Ad Hoc Meeting RI-1700119-20 Jan. 2017 (Jan. 20, 2017).
NTT DOCOMO Resource Allocation for PDSCH and CSI measurement #GPP TSG RAN WG1 Meeting #82 RI-15452428 Aug. 2015 (Aug. 28, 2015).

\* cited by examiner

- $I_n=0$: the RBG n is not allocated to the UE
- $I_n=1$: the RBG n of all TPs is allocated to the UE

- $k_n=0$: the RBG n of all the TPs is not allocated to the UE
- $k_n=m \geq 1$: the RBG n of TPm is allocated to the UE, m=1, ..., M

| RA scheme | Base RA code | RA value | RA field in binary |
|---|---|---|---|
| FO | 0110110011 ($S_{FO}$=435) | =$S_{FO}$ | 0000000110110011 |
| NO | 1021022012 ($S_{NO}$=25007) | =$2^N$+$S_{NO}$ =26031 | 0110010110101111 |

Figure 12

| Channel bandwidth | 5MHz | 10MHz | 15MHz | 20MHz |
|---|---|---|---|---|
| Signaling overhead for all the overlapping cases | 26bits | 34bits | 38bits | 50bits |
| Signaling overhead for proposed scheme | 21bits | 27bits | 31bits | 40bits |
| Signaling overhead Reduction | 5bits | 7bits | 7bits | 10bits |

Figure 13

METHOD AND APPARATUS FOR RESOURCE ALLOCATION SIGNALING IN A JOINT TRANSMISSION CELLULAR COMMUNICATION SYSTEM

FIELD OF THE INVENTION

The invention generally relates to Coordinated Multipoint (CoMP) transmission/reception in a cellular network and, more particularly, to a method and apparatus for resource allocation signaling in a joint transmission cellular communication system.

BACKGROUND OF THE INVENTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards preferably using OFDMA on the downlink (DL), SC-FDMA on the uplink (UL), and may include using multiple-input multiple-output (MIMO) antenna technology.

Cooperative communications have been proposed to exploit diversity in order to achieve better network performance. The concepts for CoMP are proposed by 3GPP, e.g. in at least: Release 9, "Evolved Universal Terrestrial Radio Access (E-UTRA); Further advancements for E-UTRA physical layer aspects"; Release 11, "Coordinated Multi-Point Operation for LTE (CoMP)"; and Release 14, "Further Enhancements for Coordinated Multipoint (CoMP) joint transmission", among others. 3GPP, Release 14 is considered as the commencement of the evolution of a 5G communications system.

CoMP transmission and reception actually refers to a wide range of techniques that enable dynamic coordination or transmission and reception with multiple geographically separated transmission points (TPs). Its aim is to achieve high data rates, improve the cell edge throughput and enhance the overall system performance. In the traditional cellular DL transmission, evidently the cell edges are the most challenging environment. Not only is the signal lower in strength because of the distance from the TP, but also interference levels from neighbouring TPs are likely to be higher as the UE will be closer to them.

CoMP therefore requires close coordination between a number of geographically separated TPs. They dynamically coordinate to provide joint scheduling and transmissions as well as providing joint processing of the received signals. In this way, a user equipment (UE) at the edge of a cell is able to be served by two or more TPs to improve signals reception/transmission and increase throughput particularly under cell edge conditions. Furthermore, the coordinated TPs can avoid scheduling the same frequency resource for the nearby UEs, which can avoid inter-cell interference (ICI).

There are three typical types of DL CoMP coordination mode discussed by 3GPP.

A first mode is Coordinated Scheduling (CS) where each UE is served by only one site. The site may be a macro/micro/pico cell, an evolved NodeB (eNB), a relay cell, a repeater, etc. The CS mode schedules the DL transmission from an eNB in a first cell to a UE in the same cell in different time-frequency resources than a transmission from an eNB in a neighbouring cell to a UE in said neighbouring cell so that any interference experienced by a UE in one cell from an eNB in a neighbouring cell is reduced.

A second mode is Coordinated Beamforming (CB). In this mode, the interference caused by an eNB in a first cell to a UE in a neighbouring cell can be reduced by spatially nulling the beams targeting said UE by certain coordination of the precoding between said eNB in the first cell and the eNB in the neighbouring cell. Interference caused by DL transmissions from the eNB in the neighbouring cell to a UE in the first cell can also be reduced by spatially nulling the beams targeting the UE in the first cell.

For both CS and CB, highly detailed feedback is required on the channel properties in a fast manner so that the changes can be made. Another requirement is for very close coordination between the TPs to facilitate the combination of data or fast switching of the cells.

The third mode is coherent joint transmission or joint processing. In this mode, multiple sites transmit the same signals at least over a subframe to the same UE simultaneously using the same resources. For example, an eNB in a first cell and an eNB in a second cell transmit the same signals to a UE in say the first cell using the same resource. The signals from the two eNBs are coherently combined in the air interface when they reach the UE. However, each serving site for the UE is required to allocate the same full set of resource blocks (RBs) to transmit the same subframe to the UE. If one site is to transmit a subframe of signal to a UE using a set of RBs, then another site cannot join the coherent joint transmission unless it has the same set of RBs available to transmit the same subframe. This requirement limits the time frequency resource utilization and restricts the scheduling and link adaptation.

This form of CoMP places a high demand on the backhaul network because the data to be transmitted to the UE needs to be sent to each eNB that will be transmitting it to the UE. This may easily double or triple the amount of data in the network dependent upon how many eNBs will be sending the data. In addition to this, joint processing data needs to be sent between all eNBs involved in the CoMP area.

US20160037511 discloses a method involving collecting channel state information (CSI) periodically reported by UEs served by a TP, e.g. eNB, within a cooperating set of eNBs in a serving CoMP-management agent (CoMP-MA). The CoMP-MA is a software entity running on or attached to each eNB participating in the CoMP transmission. The radio resource allocations, RLC and MAC headers, references to user plane data and precoding matrices are extracted from corresponding protocol entities and forwarded to transmitting network nodes in order that the transmitting CoMP-MA is able to prepare for air interface scheduling for the user terminal.

US20150098421 discloses a method involving configuring a first DL control channel for a UE being served by a first TP, such that the configuration facilitates decoding of the first DL control channel by a UE served by a second TP. The first DL control channel is transmitted. The first TP is a first base station and the second TP is a second base station. The first and second TPs share a same cell identifier (CID).

US2015189636 discloses a method involving allocating two sets of frequency resources for transmitting two sets of time slots of data in a subframe from communication nodes to a UE. One set of frequency resources is intersected with the other set of frequency resources. Union of the two sets of time slots of data is equal to the subframe. The latter set of frequency resources is selected from available frequency resources based on channel status information.

Despite technical challenges, joint transmission is one of the key improvements in 3GPP Release 14 in order to further enhance CoMP operation. In contrast to a CoMP system where a UE can be served by multiple coordinated TPs, DL transmissions for UEs at cell edges in a conventional cellular network system are typically scheduled on the same frequency resources and therefore the UEs will suffer strong ICI and high performance loss. With joint transmission as proposed in at least 3GPP Release 14, the coordination among TPs can avoid scheduling the same frequency resource for nearby UEs and avoid ICI.

In joint transmission, the coordinated TPs can have two coordination methods. The first method is to schedule the same frequency for a UE to improve spectral efficiency. The second one is to schedule different frequency resources to a UE to increase the transmission bandwidth. Both methods can improve the DL signal quality, especially for the cell-edge users. In addition, the overall system throughput will also be enhanced.

There is currently no resource allocation mechanism to indicate the joint transmission frequency resource allocation information to the UEs in the existing standard. Therefore, there is a need for a new resource allocation method and apparatus for resource allocation signaling in joint transmission systems.

OBJECTS OF THE INVENTION

An object of the invention is to mitigate or obviate to some degree one or more problems associated with known joint transmission systems.

The above object is met by the combination of features of the main claims; the sub-claims disclose further advantageous embodiments of the invention.

Another object of the invention is to provide a new resource allocation method and apparatus for resource allocation signaling in joint transmission systems.

Another object of the invention is to mitigate or obviate to some degree one or more problems associated with known communication systems.

One skilled in the art will derive from the following description other objects of the invention. Therefore, the foregoing statements of object are not exhaustive and serve merely to illustrate some of the many objects of the present invention.

SUMMARY OF THE INVENTION

In a first aspect, the invention provides a method for signaling allocation of resources in a joint transmission communication system. The method includes determining one of a plurality of resource allocation schemes to be implemented by two or more of a plurality of TPs comprising a set of coordinated TPs for enabling said two or more of said TPs to transmit data to a scheduled UE. The method may comprise determining a bit length of a resource allocation field for a resource allocation signal message based on a number of resource blocks groups (RBGs) related to a bandwidth of the joint transmission communication system and a number of TPs comprising said set of coordinated TPs and further include formatting the resource allocation signal message to provide the resource allocation field based on said determined bit length. The resource allocation signal message is transmitted from only one of said set of coordinated TPs to said scheduled UE.

Preferably, the bit length of the resource allocation field is calculated using the equation:

$$\lceil \log_2(2^N + (M+1)^N) \rceil$$

where N is the number of RBGs related to a bandwidth of the joint transmission communication system and M is the number of TPs comprising said set of coordinated TPs.

In a second aspect, the invention provides a resource allocation scheduling apparatus for signaling allocation of resources in a joint transmission communication system, the apparatus comprising: a memory; and a processor connected to the memory configured to implement the steps of the method of the first aspect of the invention.

The resource allocation scheduling apparatus may comprise any of a signaling management entity in the joint transmission communication system, a TP apparatus, and a standalone apparatus connected to one or more TPs.

In a third aspect, the invention provides a UE for a joint transmission communication system, said UE comprising: a memory; and a processor connected to the memory configured to: receive a resource allocation signal message from one of a set of coordinated TPs, said resource allocation signal message having a resource allocation field with a bit length derived a number N of RBGs related to a bandwidth of the joint transmission communication system and a number M of TPs comprising said set of coordinated TPs; and process said received resource allocation signal message to determine which RBGs are to be used by two or more of the TPs to communicate data to the UE.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which:

FIG. 12 is a diagram illustrating an example of how to derive the resource allocation filed in binary for both allocation schemes according to the invention; and FIG. 13 is a table illustrating the number of bits of reduction achieved using the resource allocation schemes in accordance with the invention, assuming the number of TPs is equal to 2.

DESCRIPTION OF PREFERRED EMBODIMENTS

Figure 1:
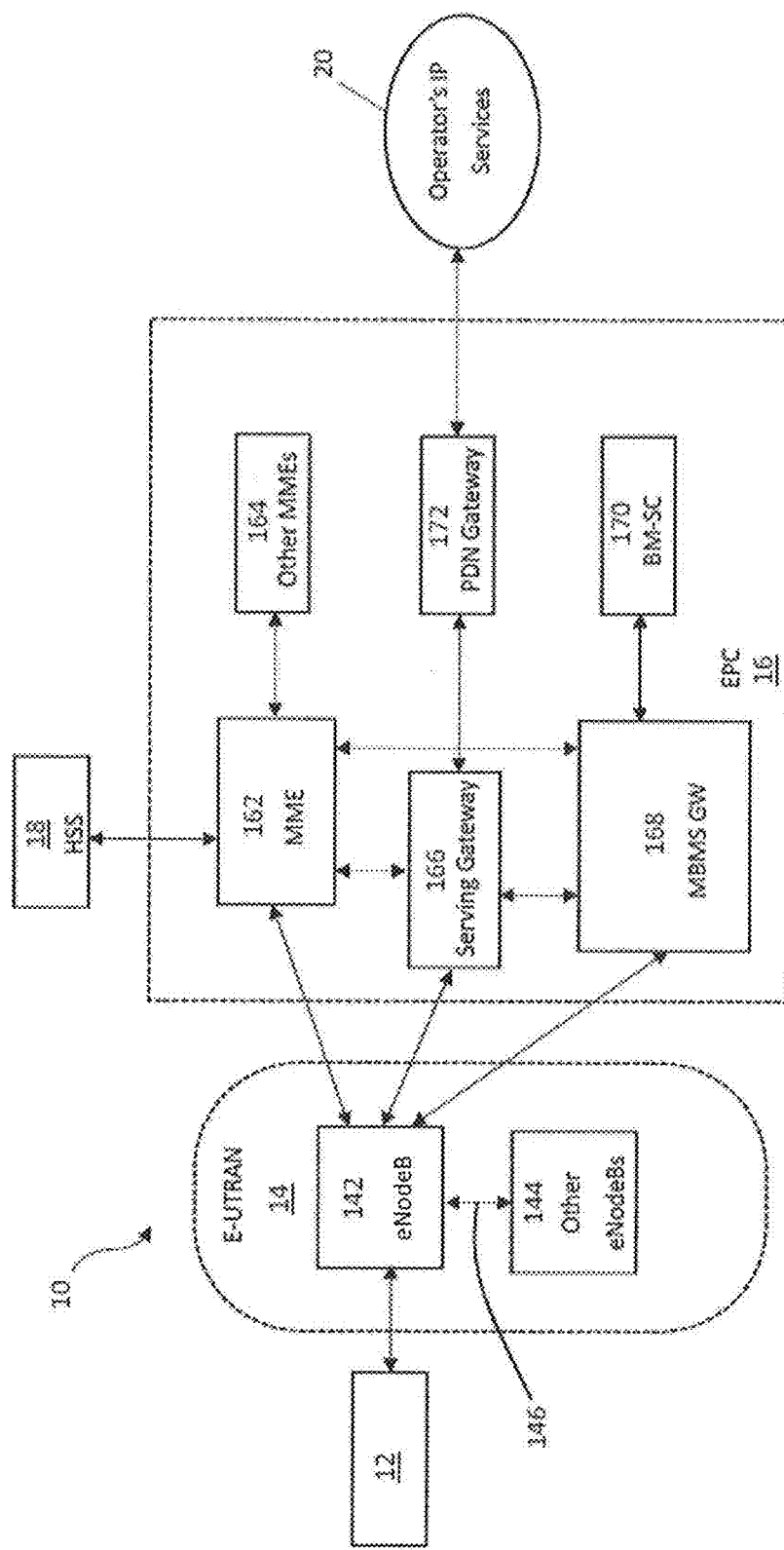
FIG. 1 is a diagram illustrating by way of example only a network architecture for embodiments of the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

FIG. 1 is a diagram illustrating, merely by way of example only, an LTE network architecture 10 in which the method of the present invention can be performed, but it will be understood by one skilled in the art that the method may be performed in other network architectures. The LTE network architecture 10 of FIG. 1 may be referred to as an Evolved Packet System (EPS) 10. The EPS 10 may include one or more user equipment (UE) 12, an Evolved UMTS Terrestrial Radio Access Network (E-UTRAN) 14, an Evolved Packet Core (EPC) 16, a Home Subscriber Server (HSS) 18, and an Operator's Internet Protocol (IP) Services 20. The EPS 16 can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN 14 includes an eNB 142 and other eNBs 144. The eNB 142 provides user and control plane protocol terminations toward the UE 12. The eNB 142 may be connected to the other eNBs 144 via a backhaul (e.g., an X2 interface) 146. The eNB 142 may also be referred to as a base station, a Node B, an access point, a TP, a base transceiver station, a radio base station, a radio transceiver, a transceiver function, a basic service set (BSS), an extended service set (ESS), or some other suitable terminology. The eNB 142 provides an access point to the EPC 16 for a UE 12. Examples of a UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 142 is connected to the EPC 16. The EPC 16 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 is the control node that processes the signaling between the UE 12 and the EPC 16. Generally, the MME 162 provides bearer and connection management. All user IP packets are transferred through the Serving Gateway 166, which itself is connected to the PDN Gateway 172. The PDN Gateway 172 provides UE IP address allocation as well as other functions. The PDN Gateway 172 is connected to the Operator's IP Services 20. The Operator's IP Services 20 may include the Internet, an intranet, an IP Multimedia Subsystem (IMS), and a PS Streaming Service (PSS). The BM-SC 170 may provide functions for MBMS user service provisioning and delivery. The BM-SC 170 may serve as an entry point for content provider MBMS transmission, may be used to authorize and initiate MBMS Bearer Services within a PLMN, and may be used to schedule and deliver MBMS transmissions. The MBMS Gateway 168 may be used to distribute MBMS traffic to the eNBs (e.g., 142, 144) belonging to a Multicast Broadcast Single Frequency Network (MBSFN) area broadcasting a particular service, and may be responsible for session management (start/stop) and for collecting eMBMS related charging information.

Figure 2:
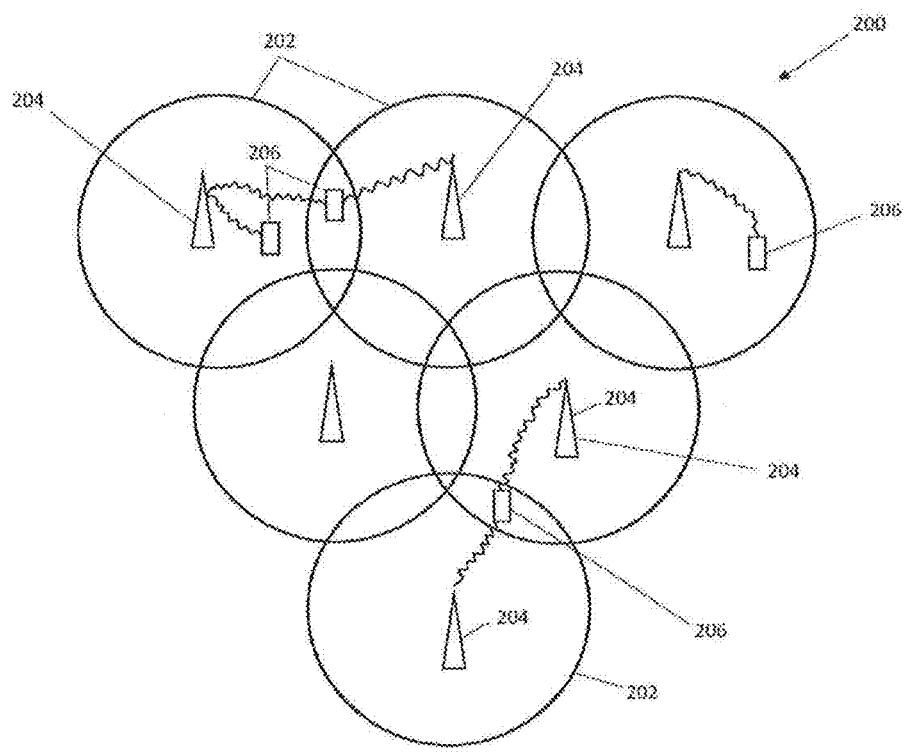
FIG. 2 is a diagram illustrating by way of example only an access network for embodiments of the present invention.

FIG. 2 is a diagram illustrating an example of an access network 200 in an LTE network architecture such as that described with respect to FIG. 1. In this example, the access network 200 is divided into a number of cellular regions (cells) 202. There is no centralized controller in this example of an access network 200, but a centralized controller may be used in some configurations. The eNBs 204 may be configured to provide all radio related functions including radio bearer control, admission control, mobility control, scheduling, security, and connectivity to the serving gateway 166. An eNB may support one or multiple cells (also referred to as a sector). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is preferably used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA, UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
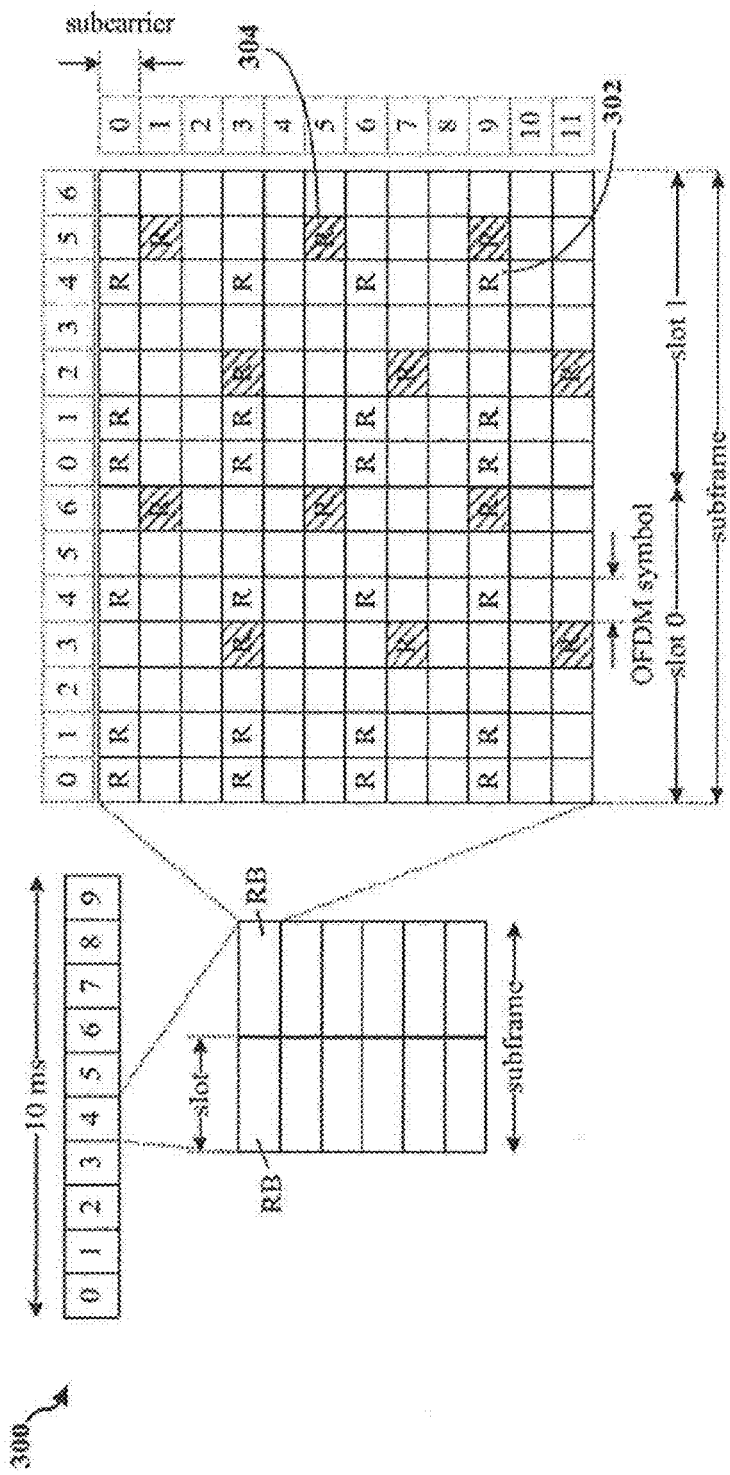
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. In frequency domain, each time slot may include multiple RBs. In LTE, a RB contains 12 consecutive subcarriers in the frequency domain and, for a normal cyclic prefix in each OFDM symbol, 7 consecutive OFDM symbols in the time domain, for a total of 84 resource elements. For an extended cyclic prefix, a RB contains 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the RBs upon which the corresponding physical DL shared channel (PDSCH) is mapped. The number of bits carried by each resource element depends on the modulation scheme. Thus, the more RBs that a UE receives and the higher the modulation scheme, the higher the data rate for the UE.

Downlink Resource Allocation

Currently, Resource Allocation Type (RAT) in LTE specifies the way in which the resource allocation scheduling apparatus allocates RBs for each transmission. To give maximum flexibility in RB allocation it is possible to use a string of a bit map where each bit represents a corresponding RB. This provides maximum flexibility in RB allocation, but it requires an unnecessarily large bit map to allocate the RBs.

LTE resolves this problem by allowing different resource allocation types, each of which uses predefined procedures. There are currently three different resource allocation types in LTE, namely RAT 0, 1, 2.

In RAT0, RB assignment information includes a bitmap indicating a set of RBGs to the scheduled UE. An RBG is a set of consecutive physical resource blocks (PRBs), herein also referred to as RBs. RAT0 is the simplest way of allocating resources and is the preferred basis for the present invention. RAT0 first divides RBs into multiples of groups RBGs. The number of RBs in each RBG varies depending on the system bandwidth and thus the RBG size differs depending on the system bandwidth. The relationship between RBG size (the number of RBs in a RBG) and the system bandwidth is shown below in Table 1.

TABLE 1

| System BW | RBG Size |
|---|---|
| 1.4 | 1 |
| 3 | 2 |
| 5 | 2 |

TABLE 1-continued

| System BW | RBG Size |
|---|---|
| 10 | 3 |
| 15 | 4 |
| 20 | 4 |

In RAT0, the signaling overhead is therefore reduced since the bitmap is defined on groups of RBs. The size of a RBG (P) is a function of system bandwidth as shown below in Table 2:

TABLE 2

| System Bandwidth ($N_{RB}^{DL}$) | RBG Size (P) |
|---|---|
| ≤10 | 1 |
| 11-26 | 2 |
| 27-63 | 3 |
| 67-100 | 4 |

The total number of RBGs ($N_{RBG}$) for DL system bandwidth $N_{RB}^{DL}$ is given by $N_{RBG} = \lceil N_{RB}^{DL}/P \rceil$ where $\lfloor N_{RB}^{DL}/P \rfloor$ of the RBGs are of size P and, if $N_{RB}^{DL}$ mod P>0, then one of the RBGs is of size $N_{RB}^{DL} - P \times \lfloor N_{RB}^{DL}/P \rfloor$. The bitmap is of size $N_{RBG}$ bits with one bitmap bit per RBG such that each RBG is addressable. In RAT0, an RBG is allocated to the scheduled UE if the corresponding bit value in the bitmap is 1, but the RBG is not allocated to the UE otherwise, i.e. its bit value is zero.

From the above, it will be understood that, for smaller bandwidths ($N_{RB}^{DL} \leq 10$), the value of P=1 (RBG size=1) which means that each RB can be addressed with a bit in the bitmap. The RBG size (P) is, however, increased with system bandwidth as smaller values of P would require more number of bits to address the entire bandwidth.

Figure 4:
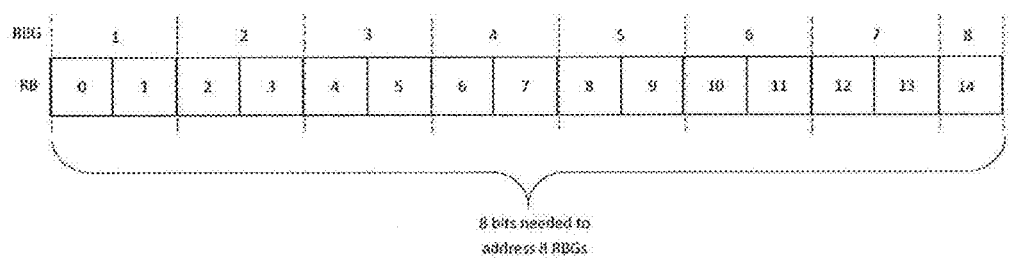
FIG. 4 is a diagram illustrating one example of a Resource Allocation Type 0 (RAT0) resource allocation field.

Taking by way of example $N_{RB}^{DL}=15$, it can be seen from the above that P=2, so the total number of RBGs $N_{RBG}=8$ out of which 7 RBGs are of size 2 RBs and one RBG is of size 1 RB. The total number of bits required for resource allocation is equal to $N_{RBG}$ which is 8 in this case. The bitmap for such an example is given in FIG. 4. In the example of FIG. 4, if the resource allocation information is say 11000001, then RBGs 1, 2 and 8 (5 RBs in total) are allocated and the remaining RBGs are not allocated to the scheduled UE.

Figure 5:
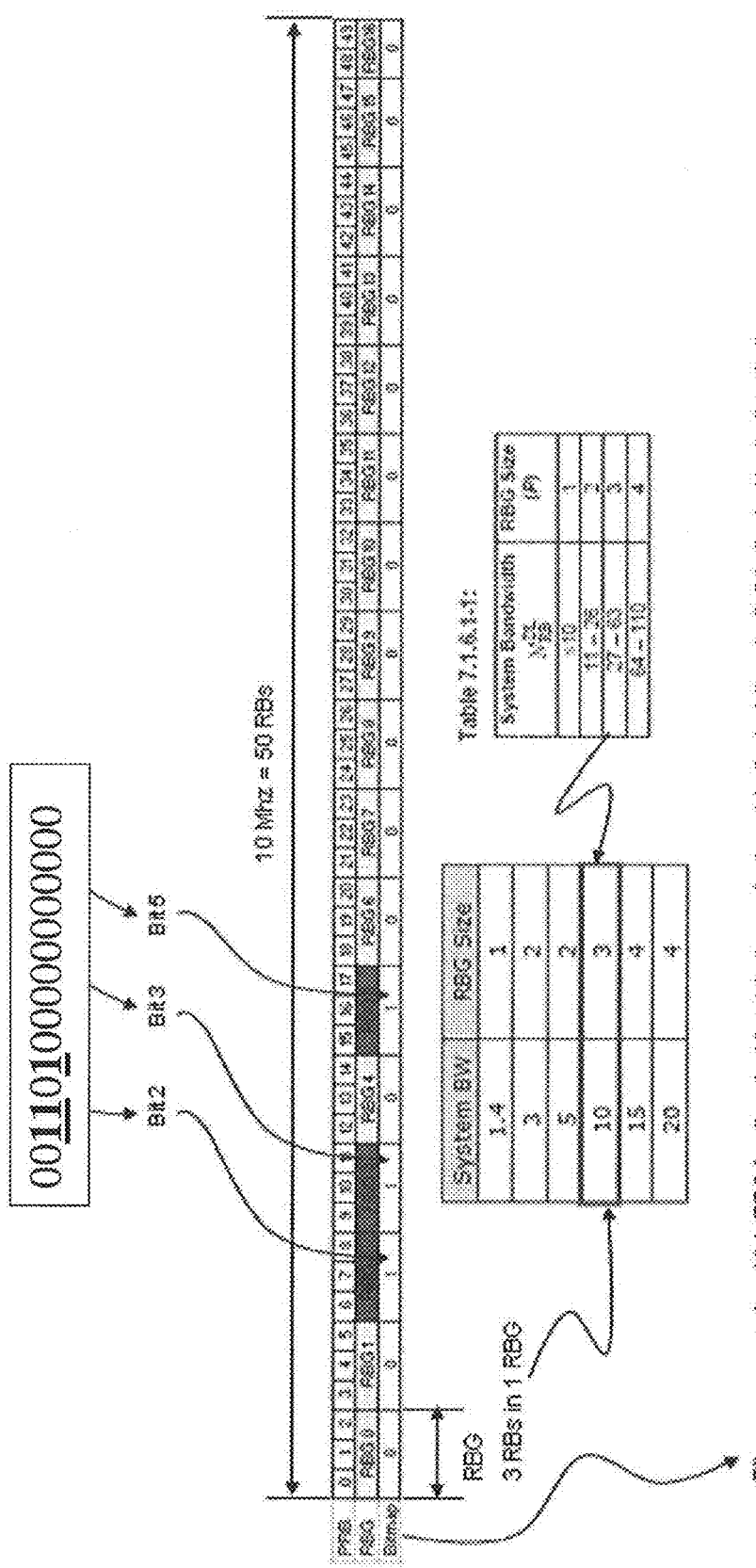
FIG. 5 is a diagram illustrating another example of a RAT0 resource allocation field for a 10 MHz bandwidth.

Shown in FIG. 5 is another example in RAT0 for a 10 Mhz system bandwidth. In this example, it will be seen that the number of bits in the resource allocation field is 17 with 17 RBGs comprising 50 RBs, i.e. 16 RBBs of 3 RBs and 1 RBG of 2 RBs.

For joint transmission, however, using a number of M TPs, the number of bits required for resource allocation using the current RAT0 would be $M \times \lceil N_{RB}^{DL}/P \rceil$ which is much too many bits to be desirable.

There is currently no resource allocation mechanism to indicate the joint transmission frequency resource allocation information to the scheduled UEs in the existing standard. The following description describes a new resource allocation method which addresses this and other technical issues.

Figure 6:
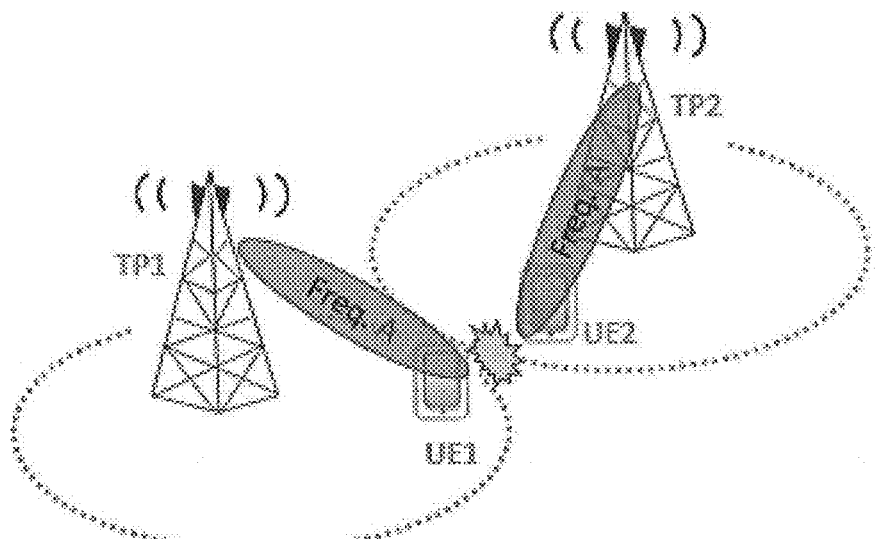
FIG. 6 is a diagram illustrating frequency collision when a UE is near the edges of the cells of two different TPs in a conventional communication system.

FIG. 6 illustrates possible frequency collision in a conventional communication system when the UEs (UE1, UE2) are near the edges of the respective cells associated with their respective TPs (TP1, TP2). In this conventional scenario, the UEs suffer strong inter-cell interference and high performance loss.

Figure 7:
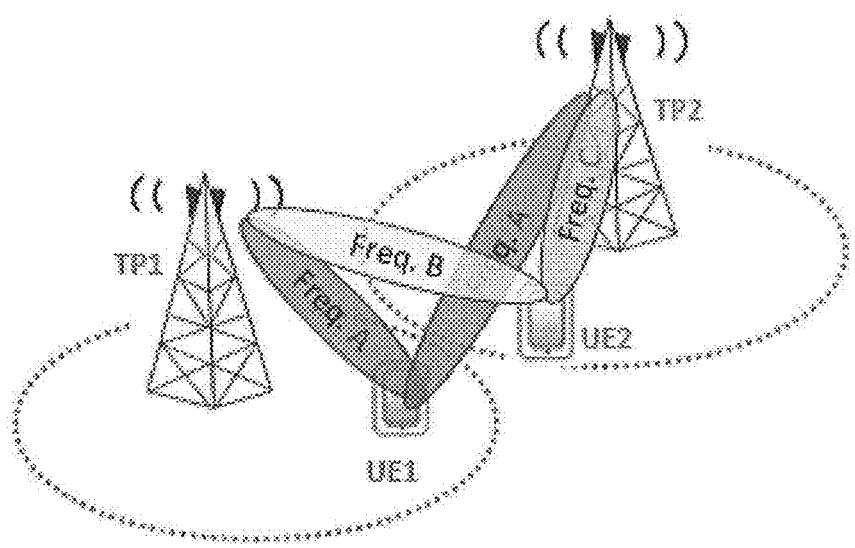
FIG. 7 is a diagram illustrating a method of joint transmission in accordance with the invention using the same frequency to transmit data from two or more TPs or by using different frequencies to transmit data from two or more TPs.

To solve this problem, the new 3GPP release 14 includes joint transmission by using the same frequency to transmit data from two or more TPs or by using different frequencies to transmit data from two or more TPs as illustrated in FIG. 7 where it can be seen that UE1 receives joint transmission resources on frequency A from both TP1 and TP2 whereas UE2 receives joint transmission resources from TP1 on frequency B and from TP2 on frequency A.

Figure 8:
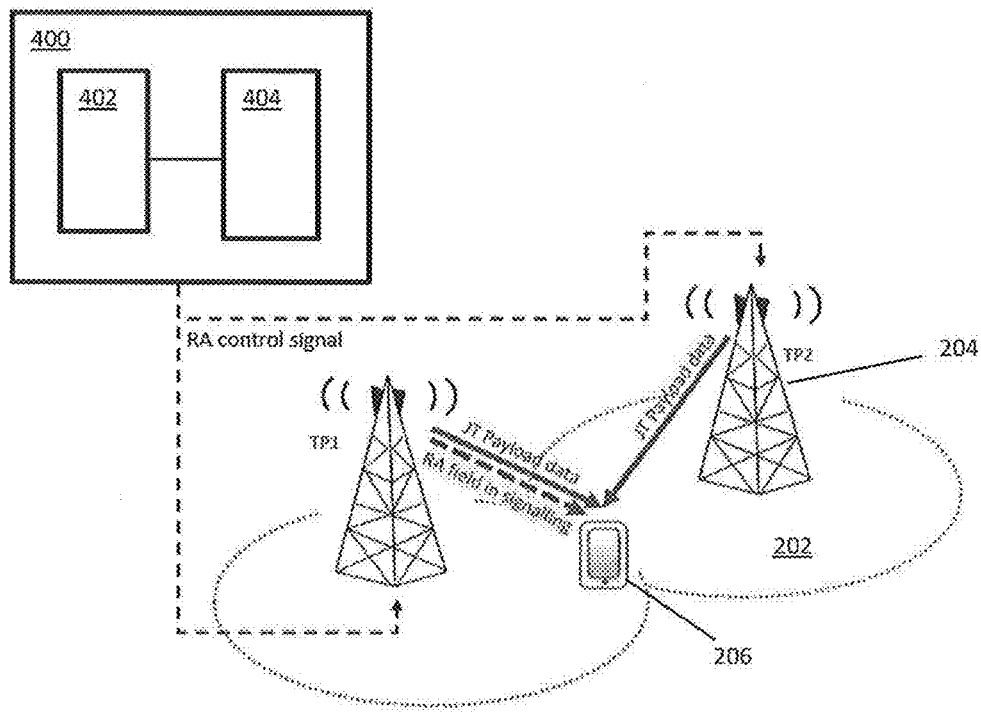
FIG. 8 is a diagram illustrating an embodiment of a resource application scheduling apparatus according to the invention and a joint transmission method where resource allocation signaling is communicated through only one of the TPs.

In accordance with the invention, to avoid high signaling overhead, however, with such multiple transmissions, one of the TPs under joint transmission, i.e. within a coordinated set of TPs, should be configured to handle the resource allocation and communicate the resource allocation signal message in concert with a resource allocation scheduling apparatus 400 as illustrated in FIG. 8. The resource allocation scheduling apparatus 400 may be a centralized apparatus provided in the MME 162 of FIG. 1 or it could be implemented in one of the TPs 204 or even comprise a standalone apparatus connected to one of more of the TPs 204. In any event, the resource allocation scheduling apparatus 400 includes a processor 402 connected to a memory 404 storing processor readable instructions. The memory 404 preferably comprises a non-transitory storage device. The processor 402, when executing the processor readable instructions, is configured to execute the steps of the method in accordance with the invention as herein described.

The resource allocation scheduling apparatus 400 is configured to determine the resource allocation schemes, to determine RBG allocation under the selected one of said schemes; and to generate a bit resource allocation field for a resource allocation message to be transmitted by only one of the TPs of the coordinated set of TPs to a UE being scheduled for DL data transmission. The RBG allocation under the selected one of said schemes determined by the resource allocation scheduling apparatus 400 may be communicated to each of the TPs 204 over the X2 interface 146 (FIG. 1) between the TPs 204. Payload data is subsequently transmitted using joint transmission through two or more of the plurality of TPs comprising the coordinated set of TPs once the scheduled UE 206 receives the bit resource allocation field in the resource allocation message. Consequently, the processor 402 of the resource allocation scheduling apparatus 400 is configured to at least perform the steps of: determining one of a plurality of resource allocation schemes to be implemented by two or more of a plurality of TPs 204 comprising a set of coordinated TPs for enabling said two or more of said TPs 204 to transmit data to the scheduled UE 206, determining a bit length of the resource allocation field for the resource allocation signal message based on a number N of RBGs related to a bandwidth of the joint transmission communication system and a number M of TPs 204 comprising said set of coordinated TPs, formatting the resource allocation signal message to provide the resource allocation field based on said determined bit length; and transmitting said resource allocation signal message from one of said set of coordinated TPs 204 to the scheduled UE 206.

The resource allocation scheduling apparatus 400 may be configured to receive CSI or information derived from CSI in order to determine which RBGs are available at any time for allocation to a scheduled UE.

The present invention focuses on two different resource allocation schemes which the resource allocation scheduling apparatus 400 can select, but the present invention is not essentially limited to said two schemes, although it preferably is so limited. As such, the preferred resource allocation signaling method of the invention does not include any partial overlapping resource allocation schemes.

Figures 9A, 9B:
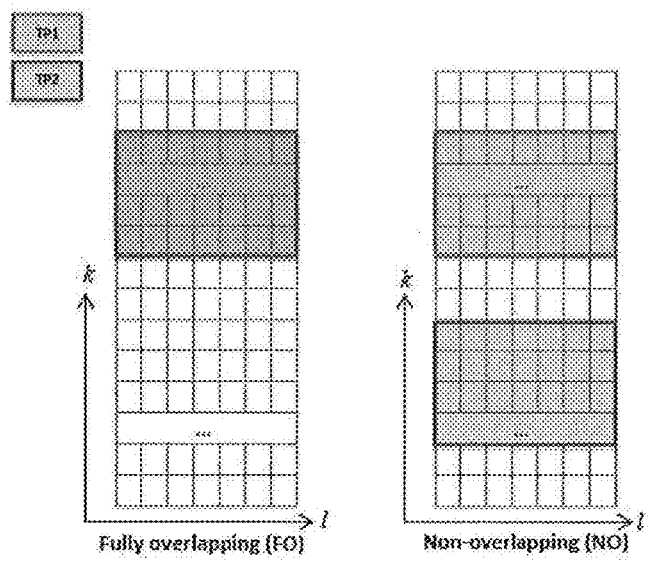
FIG. 9A is a diagram illustrating a frequency vs time diagram showing a first resource allocation scheme in accordance with the invention where the frequency spectrum of all TPs are completely overlapped.
FIG. 9B is a diagram illustrating a frequency vs time diagram showing a second resource allocation scheme in accordance with the invention where the frequency spectrum of all TPs are completely non-overlapped.

As illustrated in FIG. 9A, the first resource allocation scheme comprises multiple TPs 204 (TP1, TP2) using a same frequency to transmit data, wherein the whole frequency spectrum is completely overlapped. As illustrated in FIG. 9B, the second resource allocation scheme is based on multiple TPs 204 (TP1, TP2) using different frequencies to transmit data, wherein the frequency spectrum of each TP 204 does not overlap with that of any other TP.

Figure 10:
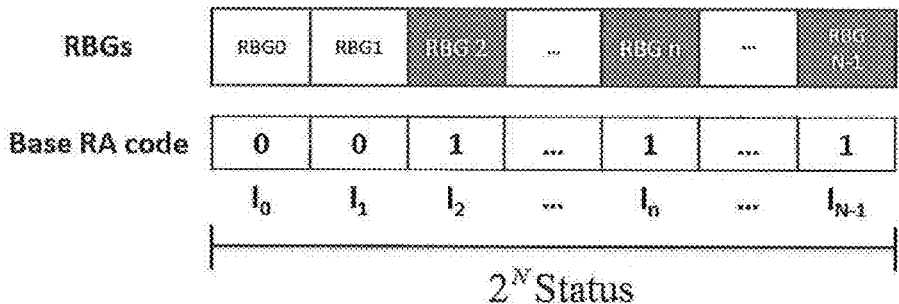
FIG. 10 is a diagram illustrating a RBG allocation arrangement used in the first resource allocation scheme.
Figure 11:
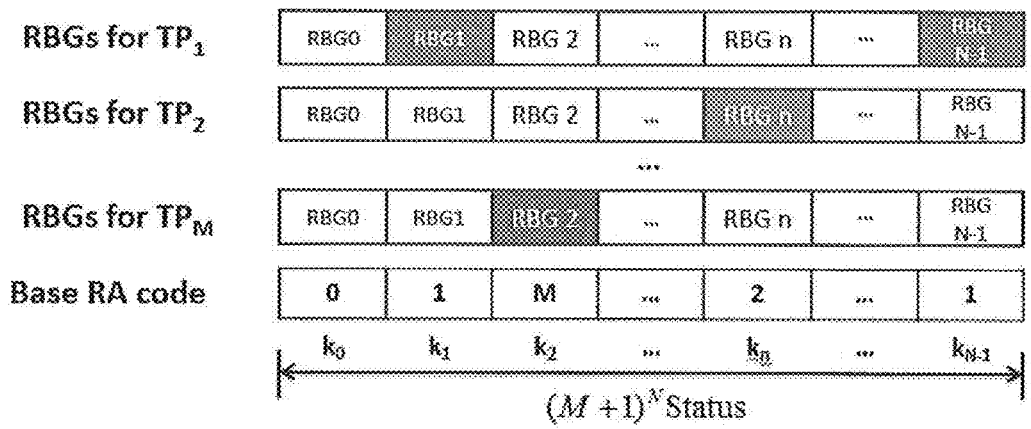
FIG. 11 is a diagram illustrating a RBG allocation arrangement used in the second resource allocation scheme.

The first resource allocation scheme (FIG. 9A) is based on RAT0 under the existing LTE resource allocation type standard. RBG allocations for all TPs are the same and the resource allocation signal message is only communicated using one of the TPs as illustrated in FIG. 8 and further illustrated in FIG. 10. In FIG. 10, it can be seen that the resource allocation field (Base RA code) has $2^N$ possible states where N comprises the number of RBGs related to a bandwidth of the joint transmission communication system. In this fully overlapping (FO) scheme, where a bit $l_n$ in the resource allocation field bitmap takes the value 0, the corresponding RBG is not allocated to the UE, i.e. the RBG is not utilised for data transmission from the coordinated set of TPs 204 to the scheduled UE 206. Where a bit $l_n$ in the resource allocation field bitmap takes the value 1, the corresponding RBG is allocated to all TPs in the coordinated set selected for data communication to the scheduled UE. For this FO allocation scheme, the resource field (Base RA code) is given by the following formula:

$$\text{Base RA code: } S_{FO} = 2^{N-1}l_0 + 2^{N-2}l_1 + 2^{N-3}l_2 + \ldots + l_{N-1} = \sum_{n=0}^{N-1} 2^{N-1-n} l_n$$

where $l_n \in \{0, 1\}$, $n=0, \ldots, N-1$ and $N=\lceil N_{RB}^{DL}/P \rceil$ is the number of RBGs In the second resource allocation scheme as further illustrated by FIG. 11, each RBG is assigned to either no TP or only one of the TPs 204. In this scheme, each TP 204 is assigned with an identifier (ID), for example, 1, 2, up to M, where M is the number of TPs 204 comprising the coordinated set of TPs 204. The resource allocation field value or code for an RBG without an assigned TP is equal to 0, i.e. the RBG is not utilised for data transmission from any of the coordinated set of TPs 204 to the scheduled UE 206. The resource allocation field value or code for an RBG with an assigned TP 204 is preferably equal to its assigned TP's ID, for example, 1, 2, up to M. Consequently, it can be seen from FIG. 11 that the resource allocation field (Base RA code) for this non-overlapping (NO) scheme has $(M+1)^N$ possible states. For this NO allocation scheme, the resource field (Base RA code) is given by the following formula:

$$\text{Base RA code: } S_{NO} = $$
$$(M+1)^{N-1}k_0 + (M+1)^{N-2}k_1 + (M+1)^{N-1}k_2 + \ldots + k_{N-1} =$$
$$\sum_{n=0}^{N-1} (M+1)^{N-1-n} k_n$$

where $k_n \in \{0, 1, \ldots, M\}$, $n=0, \ldots N-1$ and $N=\lceil N_{RB}^{DL}/P \rceil$ is the number of RBGs,
M is the number of TPs The resource allocation field is preferably transmitted in the existing predefined LTE DL control information (DCI) format and preferably reusing a non-continuous RAT format. Consequently, it is possible to use only one DCI to send the resource allocation message from only one TP 204 to the scheduled UE 206.

For the above two resource allocation schemes, the resource allocation field (Base RA code) can be calculated by combining the FO and NO allocation scheme formulas as follows:

$$RA \text{ field} = \begin{cases} S_{FO} & \text{for fully overmapping} \\ 2^N + S_{NO} & \text{for non-overmapping} \end{cases}$$

where $l_n \in \{0, 1\}$, $k_n \in \{0, 1 \ldots, M\}$, $n=0, \ldots N-1$ and $N=\lceil N_{RB}^{DL}/P \rceil$ is the number of RBGs, M is the number of TPs It can be seen that the RA (resource allocation) field for the NO allocation scheme case is offset by $2^N$, i.e. offset by the total number of possible states for the FO allocation scheme case.

Based on the total number of states for both FO and NO cases, the total signaling bits in the proposed RA scheme is given by the following equation $$\lceil \log_2(2^N + (M+1)^N) \rceil$$

As illustrated in FIG. 12, assuming the RBG number N is 10 and with two TPs, i.e. N=10 and M=2, the total signaling bits in the proposed scheme=16. For the FO scheme, if the Base RA code is as shown in FIG. 12, then, as the length of RA filed or represented in binary is less than 16, so it is desirable to add some dummy bits preferably, but not essentially, at the front as shown by the upper entry in the "RA field in binary" column in FIG. 12, the dummy bits being denoted by underscoring. Similarly, for the NO scheme, if the base RA code is as shown in FIG. 12, it is desirable to add the $2^N$ offset in the RA value and then it can be expressed as binary bits in a bitmap, and as the length is less than 16, one zero is added preferably to the front as shown by the lower entry in the "RA field in binary" column in FIG. 12.

In the foregoing, a RBG may be considered as a set of consecutive virtual resource blocks of localized type. Furthermore, it is preferable that the size of the RBG is configured by a higher communication system layer.

As illustrated in FIG. 13, the percentage of bits reduction achieved using the resource allocation method according to the invention may be reduced by between 18% and 21% and, more specifically, between 18.4% and 20.5%. For example, at 15 MHz, the bit saving on the resource allocation field is 7 bits over 38 which represents a 18% saving on overhead signaling. Therefore, the proposed resource allocation scheme reduces the UE complexity and minimizes signaling overhead.

The invention also provides a UE having a memory; and a processor connected to the memory configured to receive a resource allocation signal message from one of a set of coordinated TPs, said resource allocation signal message having a resource allocation field with a bit length derived a number N of RBGs related to a bandwidth of the joint transmission communication system and a number M of TPs comprising said set of coordinated TPs. The processor is also configured to process said received resource allocation signal message to determine which RBGs are to be used by two or more of the TPs to communicate data to the UE.

The apparatus described above may be implemented at least in part in software. Those skilled in the art will appreciate that the apparatus described above may be implemented at least in part using general purpose computer equipment or using bespoke equipment.

The hardware elements, operating systems and programming languages of such computers are conventional in nature, and it is presumed that those skilled in the art are adequately familiar therewith. Of course, any server functions may be implemented in a distributed fashion on a number of similar platforms, to distribute the processing load.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method for signaling allocation of resources in a joint transmission communication system, the method comprising:

determining one of a plurality of resource allocation schemes to be implemented by two or more of a plurality of transmission points (TPs) comprising a set of coordinated TPs for enabling said two or more of said TPs to transmit data to a scheduled user equipment (UE);

determining a bit length of a resource allocation field for a resource allocation signal message based on a number N of resource blocks groups (RBGs) related to a bandwidth of the joint transmission communication system and a number M of TPs comprising said set of coordinated TPs;

formatting the resource allocation signal message to provide the resource allocation field based on said determined bit length including formatting the resource allocation field to provide a bitmap in which each bit in the bitmap corresponds to a RBG and formatting values of the bits in the bitmap to indicate which of the RBGs is to be used by one or more of the plurality of coordinated TPs for transmitting data to the scheduled UE; and transmitting said resource allocation signal message from one of said set of coordinated TPs to said scheduled UE;

wherein the plurality of resource allocation schemes comprises only a fully overlapping (FO) resource allocation scheme and a non-overlapping (NO) resource allocation scheme;

wherein, for the FO resource allocation scheme, a value of 1 for a bit in the bitmap indicates that the RBG corresponding to said bit is to be used by all of the TPs to transmit data to the scheduled UE and a value of 0 for a bit in the bitmap indicates that the RBG corresponding to said bit is not to be used for data transmission.

2. The method of claim 1, wherein said one of said set of coordinated TPs selected to transmit said resource allocation signal message to the scheduled UE is selected by a resource allocation scheduling apparatus.

3. The method of claim 2, wherein the resource allocation signal message transmitted to the scheduled UE identifies RBGs selected by the resource allocation scheduling apparatus for use by said two or more of the coordinated TPs to communicate data to the scheduled UE.

4. The method of claim 3, wherein the resource allocation signal message identifies which two or more of the plurality of coordinated TPs are to communicate data to the scheduled UE.

5. The method of claim 1, wherein the bit length of the resource allocation field is determined as the minimum number of bits required to represent all possible states of: (i) the FO resource allocation scheme; and (ii) the NO resource allocation scheme.

6. The method of claim 1, wherein the step of determining a bit length of a resource allocation field comprises calculating the bit length of the resource allocation field from the equation $$\lceil \log_2(2^N + (M+1)^N) \rceil.$$

7. The method of claim 1, further comprising adding dummy bits to the resource allocation field if the number of bits required to represent all RBGs is less than the determined resource allocation field bit length.

8. The method of claim 7, wherein the dummy bits are added to the start of the resource allocation field.

9. The method of claim 1, wherein, for the NO resource allocation scheme, a value of m in the bitmap indicates that the RBG corresponding to said value m is to be used by a TP identified by the value m, where m=1, 2, . . . M, to transmit data to the scheduled UE and a value of 0 for a bit in the bitmap indicates that the RBG corresponding to said bit is not to be used for data transmission.

10. The method of claim 9, further comprising transforming the bitmap to a binary representation by adding $2^N$ to the binary representation.

11. The method of claim 9, further comprising adding dummy bits to the resource allocation field if the number of bits required to represent all RBGs is less than the determined resource allocation field bit length.

12. The method of claim 11, wherein the dummy bits are added to the start of the resource allocation field.

13. The method of claim 1, wherein the resource allocation field is based on a Resource Allocation Type 0 (RAT0) bitmap.

14. A resource allocation scheduling apparatus for signaling allocation of resources in a joint transmission communication system, the apparatus comprising:
a memory; and
a processor connected to the memory configured to:
determine one of a plurality of resource allocation schemes to be implemented by two or more of a plurality of transmission points (TPs) comprising a set of coordinated TPs for enabling said two or more of said TPs to transmit data to a scheduled user equipment (UE);
determine a bit length of a resource allocation field for a resource allocation signal message based on a number N of resource blocks groups (RBGs) related to a bandwidth of the joint transmission communication system and a number M of TPs comprising said set of coordinated TPs;
format the resource allocation signal message to provide the resource allocation field based on said determined bit length including formatting the resource allocation field to provide a bitmap in which each bit in the bitmap corresponds to a RBG and formatting values of the bits in the bitmap to indicate which of the RBGs is to be used by one or more of the plurality of coordinated TPs for transmitting data to the scheduled UE; and
transmit said resource allocation signal message from one of said set of coordinated TPs to said scheduled UE;
wherein the plurality of resource allocation schemes comprises only a fully overlapping (FO) resource allocation scheme and a non-overlapping (NO) resource allocation scheme; and
wherein, for the FO resource allocation scheme, a value of 1 for a bit in the bitmap indicates that the RBG corresponding to said bit is to be used by all of the TPs to transmit data to the scheduled UE and a value of 0 for a bit in the bitmap indicates that the RBG corresponding to said bit is not to be used for data transmission.

15. The resource allocation scheduling apparatus of claim 14, wherein said apparatus comprises any one of: a signaling management entity in the joint transmission communication system; a TP apparatus; and a standalone apparatus connected to one or more TPs.

16. A user equipment (UE) for a joint transmission communication system, said UE comprising:
a memory; and
a processor connected to the memory configured to:
receive a resource allocation signal message from one of a set of coordinated transmission points (TPs), said resource allocation signal message having a resource allocation field with a bit length derived from a number N of resource blocks groups (RBGs) related to a bandwidth of the joint transmission communication system and a number M of TPs comprising said set of coordinated TPs; and
process said received resource allocation signal message to determine which RBGs are to be used by two or more of the TPs to communicate data to the UE wherein said received resource allocation signal message is formatted to provide the resource allocation field based on said determined bit length and the resource allocation field is formatted to provide a bitmap in which each bit in the bitmap corresponds to a RBG and values of the bits in the bitmap are formatted to indicate which of the RBGs is to be used by one or more of the plurality of coordinated TPs for transmitting data to the scheduled UE;
wherein said processor is configured to receive said resource allocation signal message in accordance with one of only a fully overlapping (FO) resource allocation scheme and a non-overlapping (NO) resource allocation scheme; and
wherein, for the FO resource allocation scheme, a value of 1 for a bit in the bitmap indicates that the RBG corresponding to said bit is to be used by all of the TPs to transmit data to the scheduled UE and a value of 0 for a bit in the bitmap indicates that the RBG corresponding to said bit is not to be used for data transmission.

17. A method for signaling allocation of resources in a joint transmission communication system, the method comprising:
determining one of a plurality of resource allocation schemes to be implemented by two or more of a plurality of transmission points (TPs) comprising a set of coordinated TPs for enabling said two or more of said TPs to transmit data to a scheduled user equipment (UE);

determining a bit length of a resource allocation field for a resource allocation signal message based on a number N of resource blocks groups (RBGs) related to a bandwidth of the joint transmission communication system and a number M of TPs comprising said set of coordinated TPs;

formatting the resource allocation signal message to provide the resource allocation field based on said determined bit length including formatting the resource allocation field to provide a bitmap in which each bit in the bitmap corresponds to a RBG and formatting values of the bits in the bitmap to indicate which of the RBGs is to be used by one or more of the plurality of coordinated TPs for transmitting data to the scheduled UE; and transmitting said resource allocation signal message from one of said set of coordinated TPs to said scheduled UE;

wherein the plurality of resource allocation schemes comprises only a fully overlapping (FO) resource allocation scheme and a non-overlapping (NO) resource allocation scheme;

wherein, for the NO resource allocation scheme, a value of m in the bitmap indicates that the RBG corresponding to said value m is to be used by a TP identified by the value m, where m=1, 2, . . . M, to transmit data to the scheduled UE and a value of 0 for a bit in the bitmap indicates that the RBG corresponding to said bit is not to be used for data transmission.

18. A resource allocation scheduling apparatus for signaling allocation of resources in a joint transmission communication system, the apparatus comprising:

a memory; and a processor connected to the memory configured to:

determine one of a plurality of resource allocation schemes to be implemented by two or more of a plurality of transmission points (TPs) comprising a set of coordinated TPs for enabling said two or more of said TPs to transmit data to a scheduled user equipment (UE);

determine a bit length of a resource allocation field for a resource allocation signal message based on a number N of resource blocks groups (RBGs) related to a bandwidth of the joint transmission communication system and a number M of TPs comprising said set of coordinated TPs;

format the resource allocation signal message to provide the resource allocation field based on said determined bit length including formatting the resource allocation field to provide a bitmap in which each bit in the bitmap corresponds to a RBG and formatting values of the bits in the bitmap to indicate which of the RBGs is to be used by one or more of the plurality of coordinated TPs for transmitting data to the scheduled UE; and transmit said resource allocation signal message from one of said set of coordinated TPs to said scheduled UE;

wherein the plurality of resource allocation schemes comprises only a fully overlapping (FO) resource allocation scheme and a non-overlapping (NO) resource allocation scheme; and wherein, for the NO resource allocation scheme, a value of m in the bitmap indicates that the RBG corresponding to said value m is to be used by a TP identified by the value m, where m=1, 2, . . . M, to transmit data to the scheduled UE and a value of 0 for a bit in the bitmap indicates that the RBG corresponding to said bit is not to be used for data transmission.

19. A user equipment (UE) for a joint transmission communication system, said UE comprising:

a memory; and a processor connected to the memory configured to:

receive a resource allocation signal message from one of a set of coordinated transmission points (TPs), said resource allocation signal message having a resource allocation field with a bit length derived from a number N of resource blocks groups (RBGs) related to a bandwidth of the joint transmission communication system and a number M of TPs comprising said set of coordinated TPs; and process said received resource allocation signal message to determine which RBGs are to be used by two or more of the TPs to communicate data to the UE wherein said received resource allocation signal message is formatted to provide the resource allocation field based on said determined bit length and the resource allocation field is formatted to provide a bitmap in which each bit in the bitmap corresponds to a RBG and values of the bits in the bitmap are formatted to indicate which of the RBGs is to be used by one or more of the plurality of coordinated TPs for transmitting data to the scheduled UE;

wherein said processor is configured to receive said resource allocation signal message in accordance with one of only a fully overlapping (FO) resource allocation scheme and a non-overlapping (NO) resource allocation scheme; and wherein, for the NO resource allocation scheme, a value of m in the bitmap indicates that the RBG corresponding to said value m is to be used by a TP identified by the value m, where m=1, 2, . . . M, to transmit data to the scheduled UE and a value of 0 for a bit in the bitmap indicates that the RBG corresponding to said bit is not to be used for data transmission.

* * * * *